United States Patent
Stolberg-Rohr

(10) Patent No.: US 12,490,673 B2
(45) Date of Patent: Dec. 9, 2025

(54) HAULM CUTTING APPARATUS

(71) Applicant: MSR Technology ApS, Thisted (DK)

(72) Inventor: Michael Stolberg-Rohr, Thisted (DK)

(73) Assignee: MSR Technology ApS, Thisted (DK)

( * ) Notice: Subject to any disclaimer, the term of this patent is extended or adjusted under 35 U.S.C. 154(b) by 757 days.

(21) Appl. No.: 17/430,692

(22) PCT Filed: Jan. 22, 2020

(86) PCT No.: PCT/DK2020/050023
§ 371 (c)(1),
(2) Date: Aug. 12, 2021

(87) PCT Pub. No.: WO2020/164672
PCT Pub. Date: Aug. 20, 2020

(65) Prior Publication Data
US 2022/0151151 A1    May 19, 2022

(30) Foreign Application Priority Data
Feb. 15, 2019    (DK) .......................... PA 2019 70102

(51) Int. Cl.
*A01D 33/06*    (2006.01)
*A01D 19/12*    (2006.01)
(Continued)

(52) U.S. Cl.
CPC ......... *A01D 34/8355* (2013.01); *A01D 33/06* (2013.01); *A01D 34/66* (2013.01); *A01D 19/12* (2013.01); *A01D 2023/026* (2013.01)

(58) Field of Classification Search
CPC ........ A01D 33/06; A01D 13/00; A01D 21/00; A01D 19/12; A01D 2023/026;
(Continued)

(56) References Cited

U.S. PATENT DOCUMENTS 1,794,178 A * 2/1931 Karcher .................. A01D 34/84
56/255
1,848,265 A * 3/1932 Moreau .................. A01D 33/06
171/134
(Continued)

FOREIGN PATENT DOCUMENTS

DE        352933 C    5/1922
DE        3838831 A1 * 5/1990
(Continued)

OTHER PUBLICATIONS

DE3838831A1—English translation (Year: 1990).*
(Continued)

*Primary Examiner* — Joseph M Rocca
*Assistant Examiner* — Julia C Tran
(74) *Attorney, Agent, or Firm* — Robinson & Cole LLP

(57) ABSTRACT

A haulm cutting apparatus includes lateral and vertical guiding means or surfaces and a first, rotatable shear rotatable around an axis of rotation extending in a direction with a vertical component. The apparatus further includes a counter shear for cooperation with the first, rotatable shear, and the first, rotatable shear and the counter shear are positioned in a side-by-side relationship relative to a direction of travel during operation.

24 Claims, 4 Drawing Sheets

(51) Int. Cl.
*A01D 34/66* (2006.01)
*A01D 34/835* (2006.01)
*A01D 23/02* (2006.01)

(58) Field of Classification Search
CPC .... A01D 23/00; A01D 33/14; A01D 34/8355; A01D 34/66
See application file for complete search history.

(56) References Cited

U.S. PATENT DOCUMENTS

| | | | | |
|---|---|---|---|---|
| 1,901,099 | A | * | 3/1933 | Hale .................. A01D 45/02 56/102 |
| 2,005,633 | A | * | 6/1935 | Peck .................. A01D 33/06 172/111 |
| 2,606,416 | A | * | 8/1952 | Bruner ................ A01D 31/00 56/351 |
| 2,633,689 | A | * | 4/1953 | Gunderson ........... A01D 33/06 56/192 |
| 3,136,108 | A | * | 6/1964 | Wood .................. A01D 33/06 D15/15 |
| 3,246,458 | A | | 4/1966 | Lavergne |
| 3,796,268 | A | * | 3/1974 | Porter ................. A01D 45/00 171/88 |
| 3,911,651 | A | * | 10/1975 | Schreiber ............. A01D 45/22 56/98 |
| 4,009,557 | A | * | 3/1977 | Reicks ................ A01D 45/22 56/98 |
| 4,015,667 | A | * | 4/1977 | Ruozi ................ A01D 34/8355 172/194 |
| 4,090,346 | A | * | 5/1978 | Doi .................... A01D 34/47 56/13.6 |
| 4,135,580 | A | * | 1/1979 | Bouwman ............ A01D 33/06 171/6 |
| 4,397,136 | A | | 8/1983 | McLeod et al. |
| 4,416,334 | A | | 11/1983 | Bouillon |
| 5,737,908 | A | * | 4/1998 | Andelfinger ........... A01G 3/08 144/34.1 |
| 5,791,129 | A | * | 8/1998 | Pellenc ............... A01G 3/0408 56/331 |
| 5,904,033 | A | * | 5/1999 | Landeis ............... A01D 33/06 171/42 |
| 6,000,475 | A | * | 12/1999 | Fabian ............... A01D 34/8355 56/503 |
| 6,264,554 | B1 | | 7/2001 | Badry |
| 7,905,079 | B2 | | 3/2011 | Wolters et al. |
| 2018/0343795 | A1 | | 12/2018 | VanBerlo |
| 2019/0216010 | A1 | | 7/2019 | Van Beek |

FOREIGN PATENT DOCUMENTS

| | | | |
|---|---|---|---|
| EP | 0901747 A1 | * | 3/1993 |
| EP | 3530104 A1 | | 8/2019 |
| EP | 3732948 A1 | | 11/2020 |
| GB | 615095 A | | 12/1948 |
| GB | 625507 A | | 6/1949 |
| GB | 633207 A | | 12/1949 |
| GB | 1301793 A | | 1/1973 |
| JP | 2000287519 A | | 10/2000 |
| KR | 20090087858 A | | 8/2009 |
| KR | 101008716 B1 | | 1/2011 |
| KR | 20130125051 A | | 11/2013 |
| KR | 20210128569 A | | 10/2021 |
| NL | 7905829 A | | 1/1981 |
| NL | 8900274 A | * | 9/1990 ............ A01D 33/06 |
| NL | 1042461 B1 | | 1/2019 |
| SU | 728759 A1 | | 4/1980 |
| WO | 2020242296 A1 | | 5/2020 |

OTHER PUBLICATIONS

NL 8900274 A—English translation (Year: 1990).*
International Search Report issued in corresponding PCT Application No. PCT/DK2020/050023, mailed Mar. 23, 2020, pp. 1-4.

* cited by examiner

HAULM CUTTING APPARATUS

CROSS REFERENCE TO RELATED APPLICATIONS

The instant application is a U.S. National Stage application of and claims priority to PCT/DK2020/050023, filed on Jan. 22, 2020, which is a PCT application of and claims priority to DK Application No. PA 2019 70102, filed on Feb. 15, 2019, now Pat. No. DK180358, the subject matter of both aforementioned applications are hereby incorporated by reference in their entireties.

FIELD

The present invention relates to a haulm cutting apparatus comprising lateral and vertical guiding means or surfaces and a first, rotatable shear rotatable around an axis of rotation extending in a direction with a vertical component.

BACKGROUND

In different fields of agriculture haulms need to be cut at certain times during the season.

For example, in potato farming haulms need to be cut at a time prior to harvest to promote the development of the new potatoes in the ground rather than the development of the haulms above the ground.

Further, e.g. in cotton farming haulms or plant parts above the ground need to be removed after harvest in preparation for the next growth season and harvest. In so-called no-tilling cotton farming whereby it is avoided to plough or cultivate the soil, it is known to remove the haulms or plant parts above the ground by use of chemicals.

In the above cases it is, according to the view of the present inventor, beneficial when the haulms are cut at ground level or right below ground level. If cut above ground level the residual haulms above the ground risk growing new shoots, leaves, etc. If potato haulms are cut too deep in the ground the new potatoes risk being hurt.

The stalks of the haulms need not be neatly cut because crushing the cut part promotes the death of the plant to avoid growing of new shoots.

Haulm cutting apparatus are known in the art, especially flail cutters are well known comprising a horizontal rotor carrying a number of flails being rotated in respective vertical planes. Such flail cutters are used to cut the haulms above the ground leaving typically a couple of centimetres of haulm standing above the ground.

GB 1 301 793 A discloses, inter alia, a potato harvester comprising a blade cutter for cutting haulms, in the shape of a single horizontal disc with cutters along its edge. The harvester comprises a V-section depth adjusting roller that in operation rolls on top of a ridge in which the potatoes grow. By virtue of its V-shape the V-section depth roller provides for guiding the apparatus including the blade cutter or haulm cutter vertically as well as laterally. Accordingly, the V-shaped or hourglass shaped surface of the V-section depth adjusting roller provides surfaces guiding in the lateral direction as well as in the vertical direction, i.e. the depth adjusting roller comprises lateral and vertical guiding means or surfaces. The blade cutter is positioned centrally relative to the ridge the haulms of which are being cut and which is the ridge next to the ridge the potatoes of which are being harvested during a given pass of the field. The haulms are accordingly being cut a couple of centimetres above the ground. A risk of the residue of the haulms shooting after cutting does not exist because the potatoes are harvested soon after during the next pass of the field.

GB 625 507 discloses a machine for stripping haulm from potatoes and similar crops. The machine comprises a drum rotating around an axis with an upright extent the drum carrying haulm-stripping teeth at its lower edge. Offset in front of the drum a reinforced rubber platform is positioned that in use collect a layer of soil on the platform and this soil acts to back up or afford a hold for the haulm during stripping. Thus the stripping is performed by the foremost part of the drum which is forwarded approximately centrally relative to the ridge in which the potatoes grow.

SUMMARY

The object of the present invention is to provide a haulm cutting apparatus that enables precise cutting at ground level, or right below, of the haulms of crops grown in rows. It is further an object of the present invention to provide a haulm cutting apparatus that promotes the death of the plant beneath the cut haulm.

This is obtained according to the present invention in that a haulm cutting apparatus, as mentioned by way of introduction, further comprising a counter shear for cooperation with the first, rotatable shear, wherein the first, rotatable shear and counter shear are positioned in a side-by-side relationship relative to a direction of travel during operation. Using a counter shear on one hand provides for a precise cut and placing the two shears in side-by-side position entails that the shears will cut at edges that are positioned laterally relative to the direction of travel, and that may perform the cut at or slightly below the ground surface without the central parts of the shears needing to touch to surface of the ground.

In an embodiment the lateral and vertical guiding means or surfaces comprise abutment surfaces for abutment on opposite slanted ground surfaces. This embodiment is suitable for cutting haulms of crops growing on ridges such ridges having slanted or sloping sides. The lateral and vertical guiding means or surfaces may e.g. be provided by a V-section depth adjusting roller as disclosed in the above mentioned GB 1 301 793 A or it may e.g. be provided by ski- or skid-like elements or wheels provided for sliding or rolling along sloping or slanted sides of ridges.

In an embodiment the lateral and vertical guiding means or surfaces comprise at least one ground abutment surface for vertical guidance, and mutually opposite haulm engaging surfaces positioned in front of the first, rotatable shear and the counter shear for lateral guidance of the apparatus relative to the direction of travel during operation. This embodiment is suitable for cutting haulms of crops growing on a plane field. The at least one ground abutment surface may e.g. be provided by a wheel or by a ski- or skid-like element and the mutually opposite haulm engaging surfaces may e.g. be provided by a pair of ski- or skid-like elements positioned to pass on either side of stalks or haulms of a crop growing in a row.

In an embodiment the counter shear is stationary. In an embodiment the stationary counter shear is positioned below a cutting edge or rim portion of the first, rotatable shear to support the residual haulm parts in the ground during cutting by the first, rotatable shear.

In another embodiment the counter shear is a second, rotatable shear.

In a practical embodiment at least one of the first, rotatable shear and the counter shear comprises a disc mounted at an end of a shaft to extend in a plane at right angles to the shaft, a drive being provided for rotation the shaft.

In a further embodiment with a rotatable counter shear, both the first, rotatable shear and the counter shear comprise a disc mounted at an end of a respective shaft to extend in a plane at right angles to the shaft, the apparatus comprising a drive for rotation of the shafts, possibly at mutually different rotational speeds. Driving the first, rotatable shear and the counter shear at different speeds, especially for the first, rotatable shear and the counter shear to have different peripheral speeds, promotes the cutting action. It is noted that different peripheral speeds may be provided by having the first, rotatable shear and the counter shear comprising respective discs with different diameters and rotating said discs at similar or suitable different rotational speeds.

In a further embodiment the shafts extend at a mutual angle of less than 90°, particularly less than 45°, and more particularly the shafts extend in parallel. When the shafts extend in parallel, or substantially in parallel, the apparatus is mainly suitable for cutting haulms of crops growing on ridges. When the shafts are extending at a mutual angle (substantially) larger than zero, cooperating edges of the first, rotatable shear and the counter shear may dip into the ground at a position between the first, rotatable shear and the counter shear to perform the cutting while the central parts of first, rotatable shear and the counter shear remain positioned above the ground in order not to disturb the surface of the ground more than necessary.

In yet a further embodiment at least one shaft, is extending from the disc to form an angle forward of a plane perpendicular to the direction of travel, said angle being between 30° and 0, particularly below 20°, and more particularly the shaft extends in parallel to said plane. Thus the shaft may be inclined forwards from the disk and up or the shaft may extend in a plane perpendicular to the direction of travel, i.e. in a vertical plane when the field being processed in horizontal.

In an embodiment at least one of the first, rotatable shear and the counter shear comprise a circular disc with a recessed rim portion. Recesses in the rim portion provided for catching stalks or haulms in pockets formed by the recesses, while the cuts are performed, thus promoting precision and effectiveness of the cutting.

In a practical embodiment at least one of the first, rotatable shear and the counter shear comprise circular disc with at least a plane rim portion and a non-convex bottom. This embodiment is e.g. suitable for applications with shafts extending in parallel or substantially in parallel and with an apparatus intended for cutting haulms of crops growing on ridges In another practical embodiment at least one of the first, rotatable shear and the counter shear comprise a circular disc with a conical rim portion. This embodiment is e.g. suitable for applications where shafts carrying the discs are inclined relative to each other, because the conical rim portion(s) provides for the cooperating rim portions of the first, rotatable shear and the counter shear to be generally parallel at a position of cutting.

In an embodiment at least one ground engaging shear is provided behind the first, rotatable shear and the counter shear relative to the direction of travel for shifting soil onto the remains of the cut haulms. Covering the remains of the cut haulms with soil further promotes the death of the plant beneath the cut. The ground engaging shear for shifting soil may e.g. be a harrow disc and further two such ground engaging shears may be provided for shifting soil onto the remains of the cut haulms from either side.

Optionally the soil shifted onto the remains of the cut haulms may be compacted e.g. by being rolled by means of a roll having a profile corresponding to the surface to the ground at the location of the haulm being cut.

In the preparation of ridges in a field for growing e.g. potatoes it is customary to remove stones and clods from the soil of the ridge. This removal may be carried out in different ways and e.g. stones are sifted from the soil and places in rows between neighbouring ridges.

The apparatus generally has a longitudinal vertical centre plane and in a further embodiment the apparatus comprises at least one deep shear mounted on an arm at a lateral distance from the centre plane to extend asymmetrically from said arm towards the centre plane. Thus mounted on an arm at a lateral distance from the centre plane the deep shear may cut through the ground beneath e.g. a crop of potatoes to cut deep roots and further promote the death of the plants without disturbing a possible row of stones between neighbouring ridges or rows of crops.

In an embodiment a haulm ejector is provided at the first rotatable shear and the counter shear, preferably behind the first rotatable shear and the counter shear, and preferably in front of any ground engaging shear trailing the first rotatable shear and the counter shear for ejecting cut off haulm. Hereby is obtained that cut off haulm is removed from the row of crop and is not buried, neither partially nor totally, as might otherwise be the case. Hereby is avoided that cut off haulms parts are, even partially, buried above the crop in the ground thereby minimizing a risk of such buried cut off haulm parts being infected by e.g. mould fungus whereby such infection might be carried on to the crop in the ground.

BRIEF DESCRIPTION OF THE DRAWINGS

In the following the invention will be explained in further detail by way of non-limiting examples of embodiments having reference to the accompanying schematic drawings, in which.

DETAILED DESCRIPTION

Figure 1:
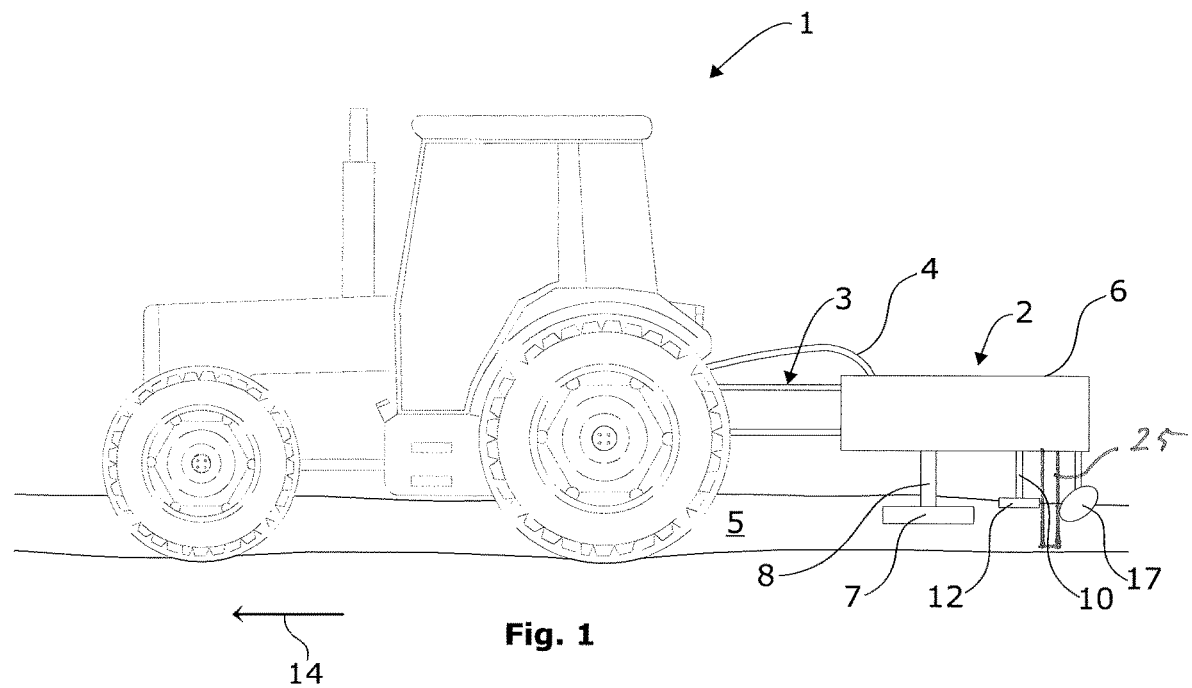
FIG. 1 is a side view of a haulm cutting apparatus according to the present invention coupled to a tractor.

FIG. 1 shows a tractor 1, and a haulm cutting apparatus 2, according to the present invention, that is coupled to the tractor 1 through a three-point suspension 3 of the tractor 1. Power is supplied from the tractor 1 to the haulm cutting apparatus 2 through a power line 4, such as a hydraulic power line or electric power line.

The tractor 1 is carrying the haulm cutting apparatus 2 along a ridge 5, in which potatoes are being grown, to cut potato haulms (not shown).

The haulm cutting apparatus 2 comprises a body or frame 6 supporting slide boards or skids 7 with abutment surfaces 7', see FIG. 2, said skids 7 being mounted via arms 8 in an adjustable manner (not shown) which the person skilled in the art can readily envisage from the general description below.

The skids 7 are preferably ski- or skid-like elements by which should be understood elements, e.g. boards, comprising a generally plane lower surface that, like at a ski, is raised at least at a front end to allow said surface to slide over the ground without risking that the front end digs into the ground.

The body or frame 6 further supports two rotatable shafts 9, 10 each carrying at a lower end a shear 11, 12 to be explained below. The body or frame 6 further accommodates drives (not shown) for rotating the two rotatable shafts 9, 10. Energy for the drives is supplied through power line 4.

As shown in FIG. 1, behind the shafts 9, 10 and the shears 11, 12, relative to the direction of travel 14, a couple of ground engaging shears, in the present embodiment in the form of harrow discs 17, is provided for shifting soil onto the remains of the cut haulms as it will be further explained below. It should be noted that the ground engaging shears or harrow discs 17 are, for sake of clarity, not shown in FIG. 2.

Figure 3:
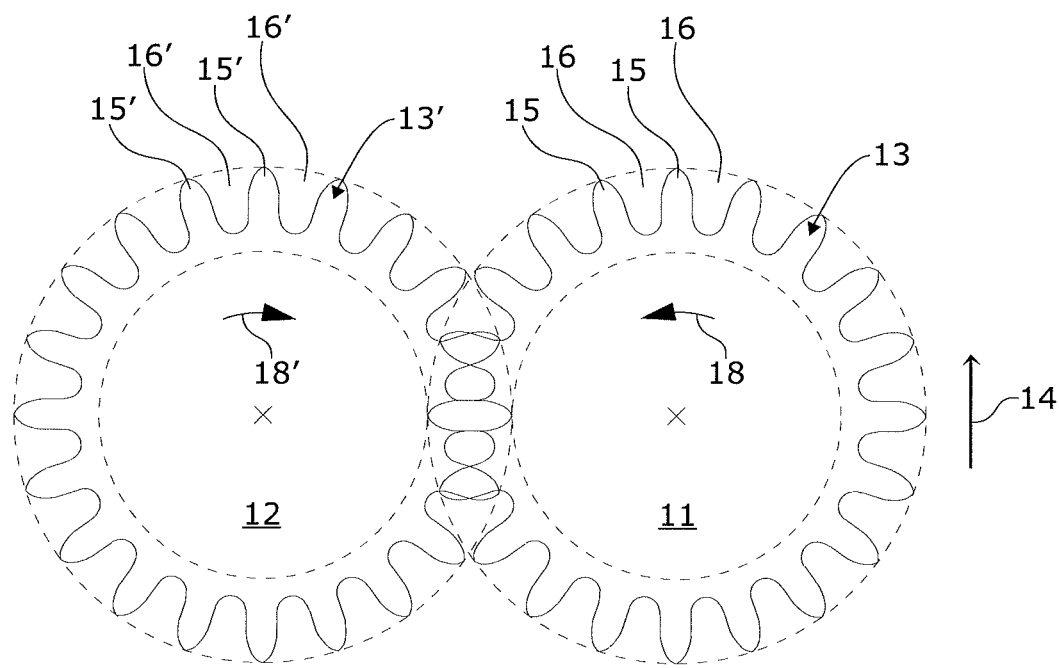
FIG. 3 illustrates in a top view an embodiment of the shears of the apparatus of the invention.
Figure 4:
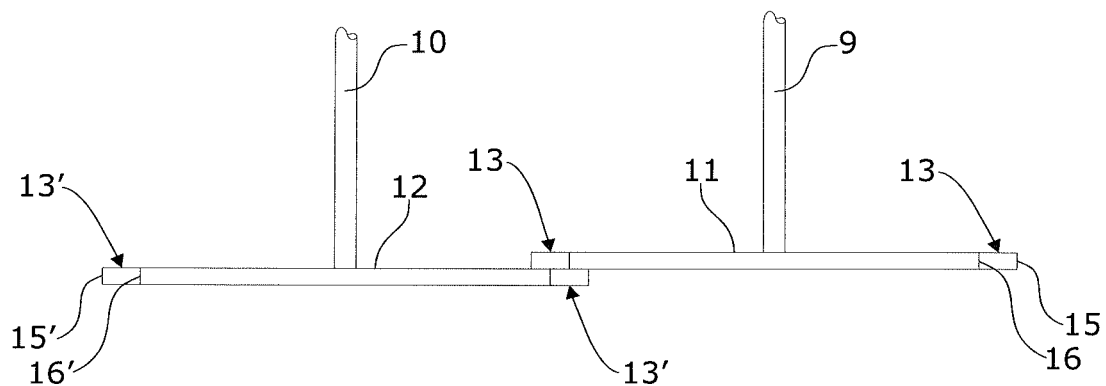
FIG. 4 is a rear view of the shears shown in FIG. 3.

Referring to FIGS. 3 and 4 the shears comprise, in the present embodiment, a first, rotatable shear 11 and second, rotatable counter shear 12. In the present embodiment the two shears are similar and comprise a plane circular disk with a recessed rim portion 13, 13'. The first, rotatable shear 11 and the counter shear 12 are positioned in a side-by-side relationship relative to a direction of travel 14 during operation, and the recessed rim portions 13, 13' are overlapping for the first, rotatable shear 11 and the counter shear 12 to cooperate in cutting.

The rim portions 13, 13' being recessed entails that each of the first, rotatable shear 11 and the counter shear 12 comprises a succession of adjacent protrusion 15, 15' extending from central parts of the respective discs. The protrusions 15, 15' defines between them pockets 16, 16'.

The drives are in the present embodiment arranged to drive the shafts 9, 10, and thus the shears 11, 12, at different rotational speeds, e.g. approx. double speed for the first, rotatable shear 11 relative to the speed of the counter shear 12. E.g. the first, rotatable shear 11 may be run at approx. 900 rpm., while the counter shear is e.g. run at approx. 500 rpm.

In operation the haulm cutting apparatus 2 is forwarded along the ridge 5 in the direction of travel 14 for the skids 7 to slide along the sloping sides of the ridge 5. The abutment surfaces 7' thereby abut on the sloping sides of the ridge 5, as seen in FIG. 2, and by proper adjustment of the height of the skids 7 relative to the body or frame 6 and/or of the mutual distance between the skids 7, the skids 7 will provide for vertical adjustment or height adjustment of the first, rotatable shear 11 and the counter shear 12 relative to the top of the ridge 5 where the haulms are to be cut. Simultaneously, due to the slope of the sides of the ridge 5 the skids 7 will also provide for lateral adjustment or centering of the first, rotatable shear 11 and the counter shear 12 relative to the top of the ridge 5. In this way the skids 7 acts as lateral and vertical guiding means or surfaces.

In operation the first, rotatable shear 11 and the counter shear 12 are rotated in counter-clockwise and clockwise direction, respectively, as indicated by arrows 18, 18' in FIG. 3. Thereby the pockets 16, 16' will receive and catch stalks or haulms that the first, rotatable shear 11 and the counter shear 12 encounter while being forwarded along the ridge 5. Due to the different speeds of the first, rotatable shear 11 and the counter shear 12 stalks or haulms thus caught will be cut by protrusions 15 of the first, rotatable shear 11 passing protrusions 15' of the counter shear 12.

A clearance should be present between the overlapping rim portions 13, 13' to avoid contact between the two rim portions and accompanying abrasion. Edges of the protrusions 15, 15' need not be particularly sharp. The combination of a clearance between the overlapping rim portions and a certain bluntness of the cutting edges of the protrusions 15, 15' entails a crushing of the cut ends of the stalks or haulms which beneficially promotes the withering of the plant residuals in the ground.

The skilled person will appreciate that the bottoms of the first, rotatable shear 11 and the counter shear 12 beneficially are generally non-convex for the centre of the respective shears not to extend into the ground.

Once the stalks or haulms have been cut the remains of the cut stalks or haulms are covered by soil shifted or scraped there onto by the harrow discs 17. This soil shuts out the sun light from the remains of the cut stalks or haulms thereby further promoting the death or withering of the plant residuals in the ground.

Figure 3A:
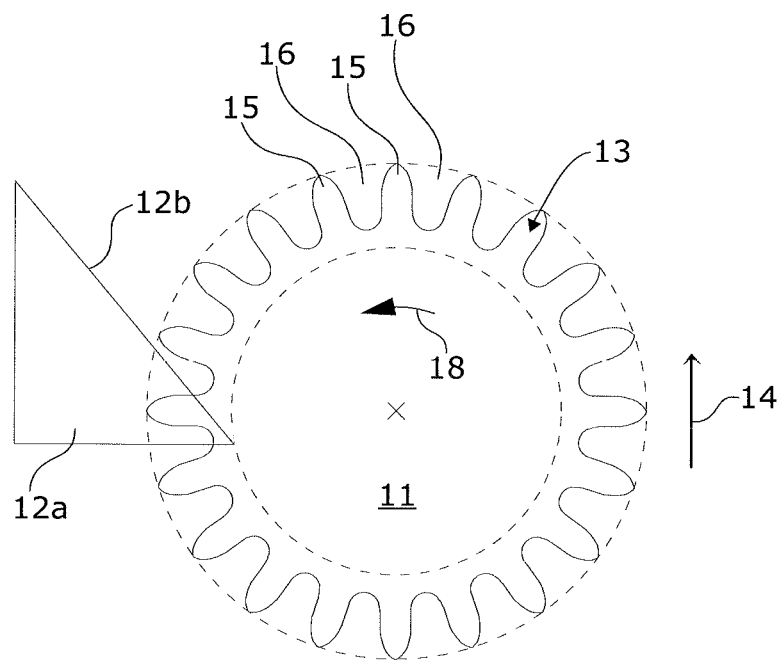
FIG. 3a is a view similar to FIG. 3, but illustrating a different embodiment.

FIG. 3*a* illustrates a variant of the above embodiment in which the second, rotatable counter shear 12 has been substituted by a stationary counter shear 12*a* with a bias edge 12*b*. In operation the first, rotatable shear 11 will rotate counter clockwise as indicated by the arrow 18 and stalks or haulms will be caught in a pocket 16 in the rim portion 13 to be carried along until the stalk or haulm meets the bias edge 12*b* whereupon the stalk or haulm will be cut by the protrusion 15 succeeding the respective pocket 16 passing the bias edge 12*b*.

Figure 5:
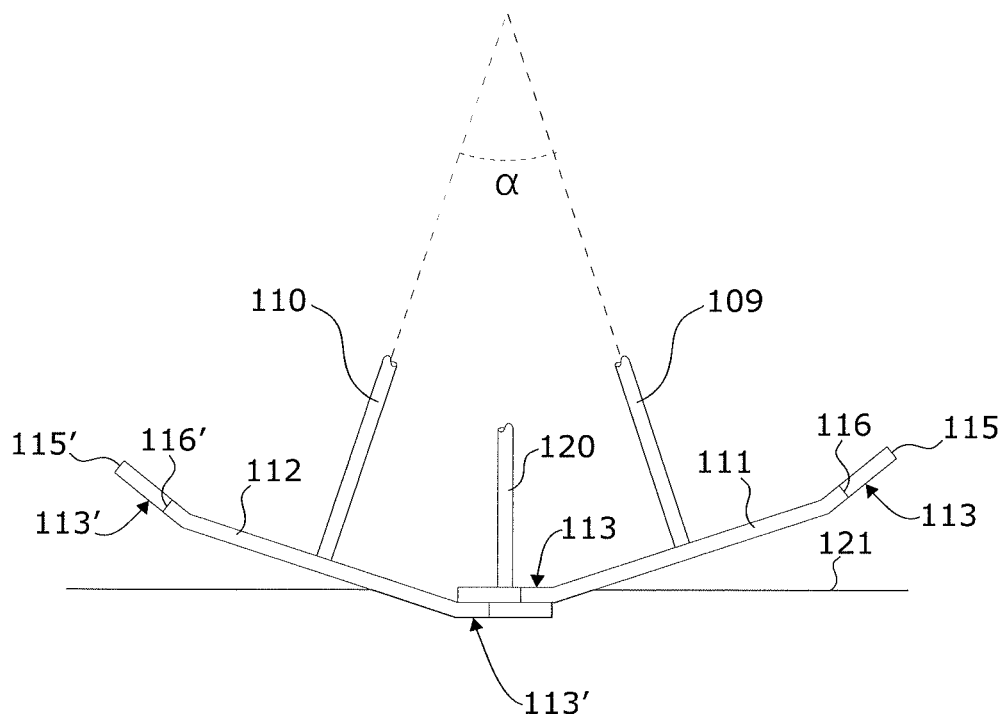
FIG. 5 is a view similar to FIG. 4, but illustrating a different embodiment.
Figure 6:
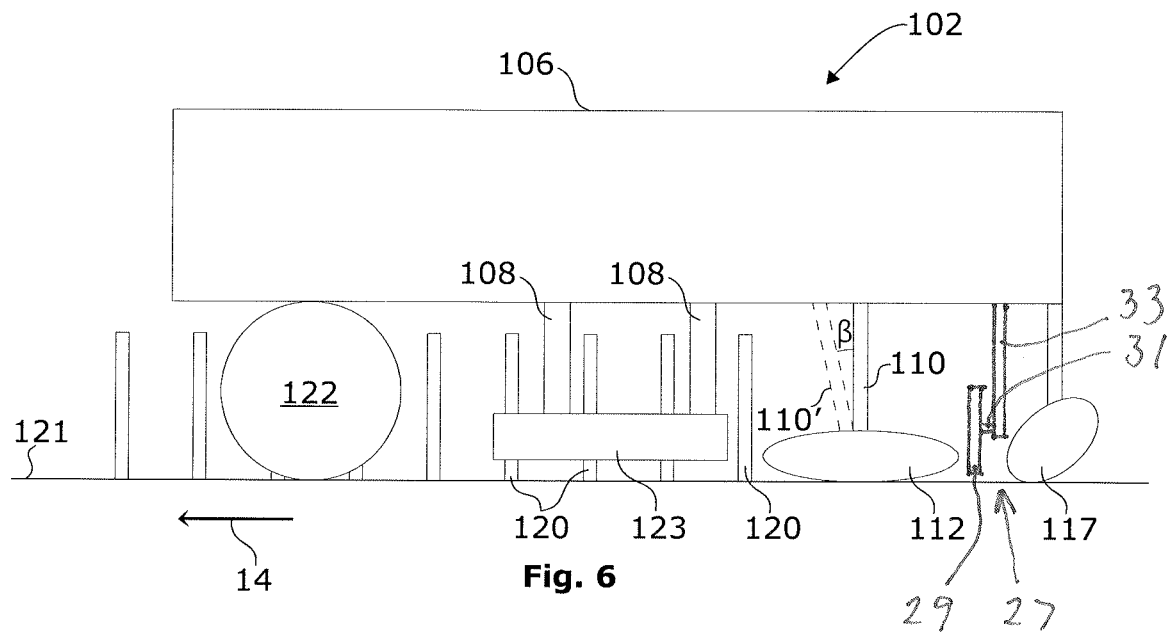
FIG. 6 is a side view of the embodiment of FIG. 5.
Figure 7:
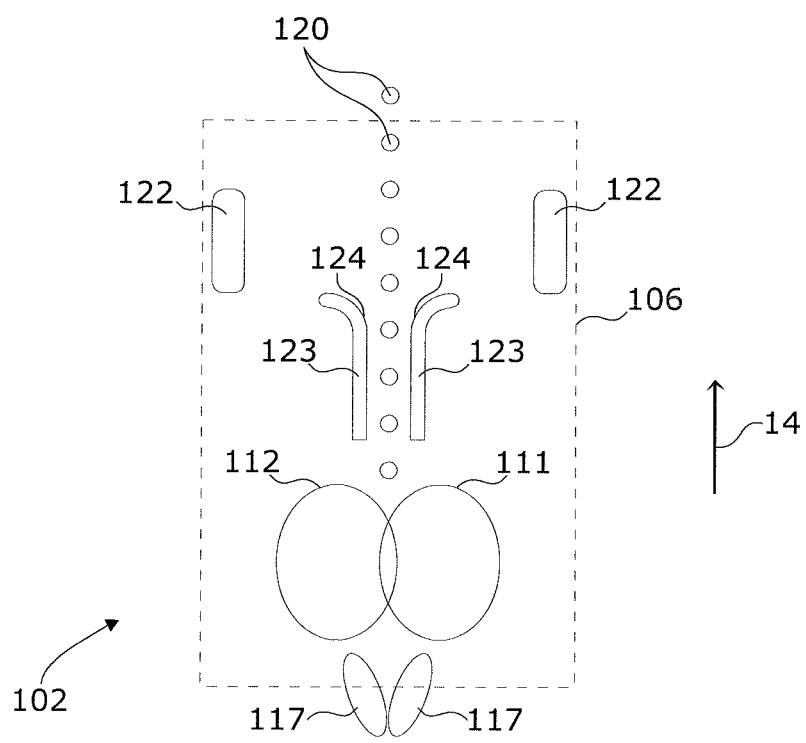
FIG. 7 is a top view of the embodiment of FIG. 5.

FIGS. 5 to 7 illustrate a variant of a haulm cutting apparatus 102 according to the present invention. In the following similar elements of the variant are designated by the same numbers as at the first embodiment with the addition of 100. Like the haulm cutting apparatus 2 the haulm cutting apparatus 102 is provided for coupling to a tractor 1 through the three-point suspension 3 of the tractor 1.

The haulm cutting apparatus 102 is provided for cutting haulms or stalks 120 of a crop grown in a plane field 121.

Thus, the haulm cutting apparatus 102 comprises ground wheels 122 providing ground abutting surfaces for vertical guidance of the haulm cutting apparatus 102. The ground wheels 122 are height adjustable relative to the body or frame 106 in a manner not shown, but at least one such manner will be familiar to the skilled person. Further the haulm cutting apparatus 102 comprises a pair of skids 123 providing mutually opposite haulm engaging surfaces 124 positioned in front of a first, rotatable shear 111 and a counter shear 112 for lateral guidance relative to the direction of travel 14 during operation. The skids 123 are attached to the body or frame 106 through arms 108, possibly with provisions for adjusting the mutual distance between the two skids 123.

To facilitate the lateral guidance by the skids 123, the ground wheels 122 may be swivel wheels respectively mounted for rotation about an upright axis in front of the centre of the ground wheel 122. More sophisticated solutions may be envisaged by the skilled person.

The first, rotatable shear 111 and the counter shear 112 like the first, rotatable shear 11 and the counter shear 12 of the first embodiment comprise rim portions 113, 113' that include protrusions 115, 115' and pockets 116, 116' therebetween. However, in this variant the rim portions 113, 113' are conical as illustrated in FIG. 5. Further the shafts 109 and 110 are extending at mutually opposite angles relative to vertical. Hereby a mutual angle α between the two shafts 109, 110 is less than 90° and in the present embodiment even less than 45°.

Behind the first, rotatable shear 111 and the counter shear 112 a pair of harrow discs 117 are mounted for scraping or shifting soil onto the remains of cut haulms or stalks or haulms, like in the first embodiment.

In operation, the haulm cutting apparatus 102 will be moved along a row of stalks 120 of a crop grown in a plane field 121 in the direction of travel 14. Such stalks 120 may e.g. be remains of cotton plants after the cotton has been harvested. The stalks 120 will be caught between the skids 123 that will thereby guide the haulm cutting apparatus 102 laterally. When reaching the rotating first, rotatable shear 111 and counter shear 112 the stalks 120 are caught in pockets 116, 116' of the first, rotatable shear 111 and the counter shear 112 to be cut by the protrusions 115, 115' because the first, rotatable shear 111 and the counter shear 112 rotates at different speeds like at the first embodiment.

Due to the mutually angled position of the first rotatable shear 111 and the counter shear 112 the stalks 120 are cut just below the surface of the field 121, as indicated in FIG. 5, without the central parts of the first, rotatable shear 111 and the counter shear 112 disturbing the surface of the field.

Like at the first embodiment, the harrow discs 117 subsequently scrape soil onto the remains of the cut stalks.

In the embodiments described above the rotatable shafts 9, 10, 109, 110 are extending parallel to a plane perpendicular to the direction of travel 14. It is however possible to arrange at least one of said shaft to extend from the disc to form an angle β forward of a plane perpendicular to the direction of travel, as indicated by the shaft 110' shown in broken lines in FIG. 6. It is noted that inclining in this way the shaft would entail that the respective shear is also inclined correspondingly, which is however not shown in FIG. 6. The angle β may be between 30° and 0, particularly below 20°, e.g. in the range of 5°-15°.

Figure 2:
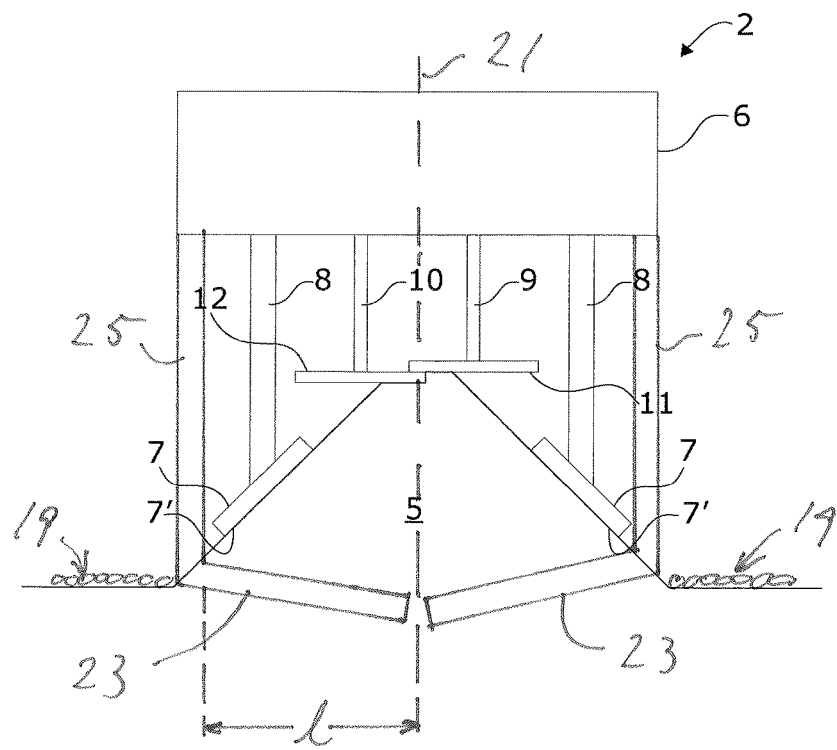
FIG. 2 is partial a rear view of the haulm cutting apparatus shown in FIG. 1.

As shown in FIG. 2, on either side of the ridge 5 a row of stones 19 is present. These rows of stones 19 have been formed during the preparation of the ridges whereby the stones have been sifted from the soil of the ridges and been placed in rows between neighbouring ridges 5 (of which only one is shown).

The apparatus 2 generally has a longitudinal vertical centre plane 21 and, as shown schematically in FIGS. 1 and 2, in a further embodiment the apparatus comprises at least one deep shear 23 mounted on an arm 25 at a lateral distance l from the centre plane 21 to extend asymmetrically from said arm 25 towards the centre plane 21. In the embodiment shown, the deep shear 23 extends only towards the centre plane 21 from the arm 25, but the arm 25 and the attachment of the deep shear 23 to the arm 25 might be arranged for the deep shear to extend slightly away from the centre plane relative to its point of attachment to the arm 25. Thus mounted on the arm 25 at a lateral distance l from the centre plane 21 the deep shear 23 may cut through the ground beneath e.g. a crop of potatoes to cut deep roots and further promote the death of the plants without disturbing the row of stones 19 between the neighbouring ridges 5 and without the ridges being substantially disturbed.

In the embodiment shown, two arms 25 and deep shears 23 are provided symmetrically around the centre plane 21 as a left arm and deep shear and a right arm and deep shear for the deep shears 23 to extend towards each other and almost meet. It is however possible that the left and right deep shear meet at the centre plane to constitute a single deep shear extending between the left arm and the right arm or the left and right deep shear may extend in an overlapping manner offset in the longitudinal direction.

In yet a further embodiment indicated in FIG. 6 only, though applicable to the other embodiments disclosed herein, a haulm ejector 27 is provided at the first rotatable shear 111 and the counter shear 112, namely behind the first rotatable shear 111 and the counter shear 112. Moreover, the haulm ejector is in the embodiment shown positioned in front of the ground engaging shears i.e. the harrow discs 117 trailing the first rotatable shear and the counter shear for ejecting cut off haulm. Hereby is obtained that cut off haulm is removed from the row of crop and is not buried, neither partially nor totally, as might otherwise be the case. Hereby is avoided that cut off haulms parts are, even partially, buried above the crop in the ground thereby minimizing a risk of such buried cut off haulm parts being infected by e.g. mould fungus whereby such infection might be carried on to the crop in the ground.

In the embodiment shown the haulm ejector 27 is provided by a rake wheel 29 mounted for driven rotation on a shaft 31 extending in the direction of travel 14. Thus, the rake wheel 29 will in use rotate in a vertical plane perpendicular to the direction of travel 14 to eject cut off haulm parts sideways away from the row of crops. The shaft 31 per se is mounted on an arm 33 extending downwards from the body or frame 106 of the apparatus.

The person skilled in the art will appreciate that other kinds of ejectors might be used and are as such known in the art, e.g. ejectors comprising a pair of running, endless bands having mutually adjacent and parallel flights that between them may catch and convey the cut off haulm parts. Such running endless bands may each be running over a slender, substantially vertical driven roller or shaft and a slender, substantially vertical idler roller or shaft, the driven rollers or shaft and the idler rollers or shafts respectively being pairwise positioned generally parallel to each other at a mutual distance to allow the bands to catch and transport the haulm parts. When e.g. the driven rollers or shafts are positioned rear of the idler rollers or shafts, the idler rollers or shafts might be positioned in front of the shafts 109 and 110 of the first, rotatable shear 111 and the counter shear 112 for the bands to catch between them haulm parts in front of the first, rotatable shear 111 and the counter shear 112 to support the movement of the haulm parts between the shafts 109 and 110 and past first, rotatable shear 111 and the counter shear 112 to eject the haulm parts rear of first, rotatable shear 111 and the counter shear 112 when the haulm parts have been cut off.

Still further embodiments might comprise a pair of rollers positioned side by side in relation to the direction of travel and, like the rake wheel 29, behind first, rotatable shear 111 and the counter shear 112, such rollers having generally vertical axes of rotation and rotating to catch haulm parts between them and eject the haulm parts rearwardly. The pair of rollers might be generally ball shaped or cylindrical and might be provided with spikes or protrusions to facilitate catching the haulm parts.

Though the invention has by way of example been described above having reference to specific embodiments, it should be understood that the invention is not limited to such embodiments. Also, it should be understood that features of the different embodiments may be mixed in any convenient way that the skilled person may envisage.

What is claimed is:

1. A potato haulm cutting apparatus comprising lateral and vertical guiding means or surfaces and a first, rotatable shear rotatable around an axis of rotation extending in a direction with a vertical component, and further comprising a rotatable counter shear for cooperation with the first, rotatable shear, wherein the first, rotatable shear and rotatable counter shear are positioned in a side-by-side relationship relative to a direction of travel during operation, and wherein both the first, rotatable shear and the rotatable counter shear comprise a circular disc with a recessed rim portion, said discs mounted at an end of a respective shaft to extend in a plane at right angles to the shaft, the apparatus comprising a drive for rotation of the shafts at mutually different rotational speeds, each of the first, rotatable shear and the rotatable counter shear comprise a succession of adjacent protrusions extending from central parts of the respective discs, the protrusions defining pockets therebetween whereby, in operation, the pockets overlap and are open and are thereby configured to receive and catch potato haulms and due to the different speeds of the first, rotatable shear and the rotatable counter shear, potato haulms are caught and cut by first protrusions of the first, rotatable shear passing second protrusions of the counter shear.

2. The potato haulm cutting apparatus according to claim 1, wherein the lateral and vertical guiding means or surfaces comprise abutment surfaces for abutment on opposite slanted ground surfaces.

3. The potato haulm cutting apparatus according to claim 1, wherein the shafts extend at a mutual angle ($\alpha$) of one of: less than 90°; less than 45°; and 0°.

4. The potato haulm cutting apparatus according to claim 1, wherein at least one shaft is extending from the disc to form an angle ($\beta$) forward of a plane perpendicular to the direction of travel, said angle ($\beta$) being one of: between 30° and 0; below 20°; and 0°.

5. The potato haulm cutting apparatus according to claim 1, wherein at least one of the first, rotatable shear and the counter shear comprise a circular disc with at least a plane rim portion and a non-convex bottom.

6. The potato haulm cutting apparatus according to claim 1, wherein at least one of the first, rotatable shear and the counter shear comprise a circular disc with a conical rim portion.

7. The potato haulm cutting apparatus according to claim 1, wherein at least one ground engaging shear is provided behind the first, rotatable shear and the counter shear relative to the direction of travel for shifting soil onto remains of cut potato haulms.

8. The potato haulm cutting apparatus according to claim 1, wherein the apparatus has a longitudinal vertical center plane, the apparatus further comprising at least one deep shear mounted on an arm at a lateral distance from the center plane to extend asymmetrically from said arm towards the center plane.

9. The potato haulm cutting apparatus according to claim 8, wherein the at least one deep shear is positioned below the first, rotatable shear and the rotatable counter shear.

10. The potato haulm cutting apparatus according to claim 8, wherein the at least one deep shear is positioned backward from the first, rotatable shear and the rotatable counter shear, in a direction of travel of the potato haulm cutting apparatus.

11. The potato haulm cutting apparatus according to claim 8, wherein the at least one deep shear is configured to cut through the ground beneath a crop of potatoes to cut roots of the potato, while the potatoes remain in the ground.

12. The potato haulm cutting apparatus according to claim 1, wherein a haulm ejector is provided at the first rotatable shear and the counter shear, behind the first rotatable shear and the counter shear, and in front of a ground engaging shear trailing the first rotatable shear and the counter shear for ejecting cut off haulm.

13. A potato haulm cutting apparatus comprising lateral and vertical guiding means or surfaces and a first, rotatable shear rotatable around an axis of rotation extending in a direction with a vertical component, and further comprising a rotatable counter shear for cooperation with the first, rotatable shear, wherein the first, rotatable shear and the rotatable counter shear are positioned in a side-by-side relationship relative to a direction of travel during operation, and wherein both the first, rotatable shear and the rotatable counter shear comprise a circular disc with a recessed rim portion, whereby each of the first, rotatable shear and the rotatable counter shear comprise a succession of adjacent protrusions extending from central parts of the respective discs, the protrusions defining pockets therebetween whereby, in operation, the pockets overlap and are open and are thereby configured to receive and catch potato haulms and due to different speeds of the first, rotatable shear and the rotatable counter shear, potato haulms are caught and cut by first protrusions of the first, rotatable shear passing second protrusions of the counter shear.

14. The potato haulm cutting apparatus according to claim 13, wherein the lateral and vertical guiding means or surfaces comprise abutment surfaces for abutment on opposite slanted ground surfaces.

15. The potato haulm cutting apparatus according to claim 13, wherein the shafts extend at a mutual angle ($\alpha$) of one of: less than 90°; less than 45°; and 0°.

16. The potato haulm cutting apparatus according to claim 13, wherein at least one shaft is extending from the disc to form an angle ($\beta$) forward of a plane perpendicular to the direction of travel, said angle ($\beta$) being one of: between 30° and 0; below 20°; and 0°.

17. The potato haulm cutting apparatus according to claim 13, wherein at least one of the first, rotatable shear and the rotatable counter shear comprise a circular disc with at least a plane rim portion and a non-convex bottom.

18. The potato haulm cutting apparatus according to claim 13, wherein at least one of the first, rotatable shear and the rotatable counter shear comprise a circular disc with a conical rim portion.

19. The potato haulm cutting apparatus according to claim 13, wherein at least one ground engaging shear is provided behind the first, rotatable shear and the rotatable counter shear relative to the direction of travel for shifting soil onto the remains of the cut haulms.

20. The potato haulm cutting apparatus according to claim 13, wherein the apparatus has a longitudinal vertical center plane, the apparatus further comprising at least one deep shear mounted on an arm at a lateral distance from the center plane to extend asymmetrically from said arm towards the center plane.

21. The potato haulm cutting apparatus according to claim 20, wherein the at least one deep shear is positioned below the first, rotatable shear and the rotatable counter shear.

22. The potato haulm cutting apparatus according to claim 20, wherein the at least one deep shear is positioned backward from the first, rotatable shear and the rotatable counter shear, in a direction of travel of the potato haulm cutting apparatus.

23. The potato haulm cutting apparatus according to claim 20, wherein the at least one deep shear is configured to cut through the ground beneath a crop of potatoes to cut roots of the potato, while the potatoes remain in the ground.

24. The potato haulm cutting apparatus according to claim 13, wherein a haulm ejector is provided at the first rotatable shear and the rotatable counter shear, preferably behind the first rotatable shear and the rotatable counter shear, and preferably in front of any ground engaging shear trailing the first rotatable shear and the rotatable counter shear for ejecting cut off potato haulm.

\* \* \* \* \*